June 24, 1930. E. T. MEAKIN 1,766,031
APPARATUS FOR PROCESSING ANIMAL MATTER
Filed Nov. 13, 1922 3 Sheets-Sheet 1
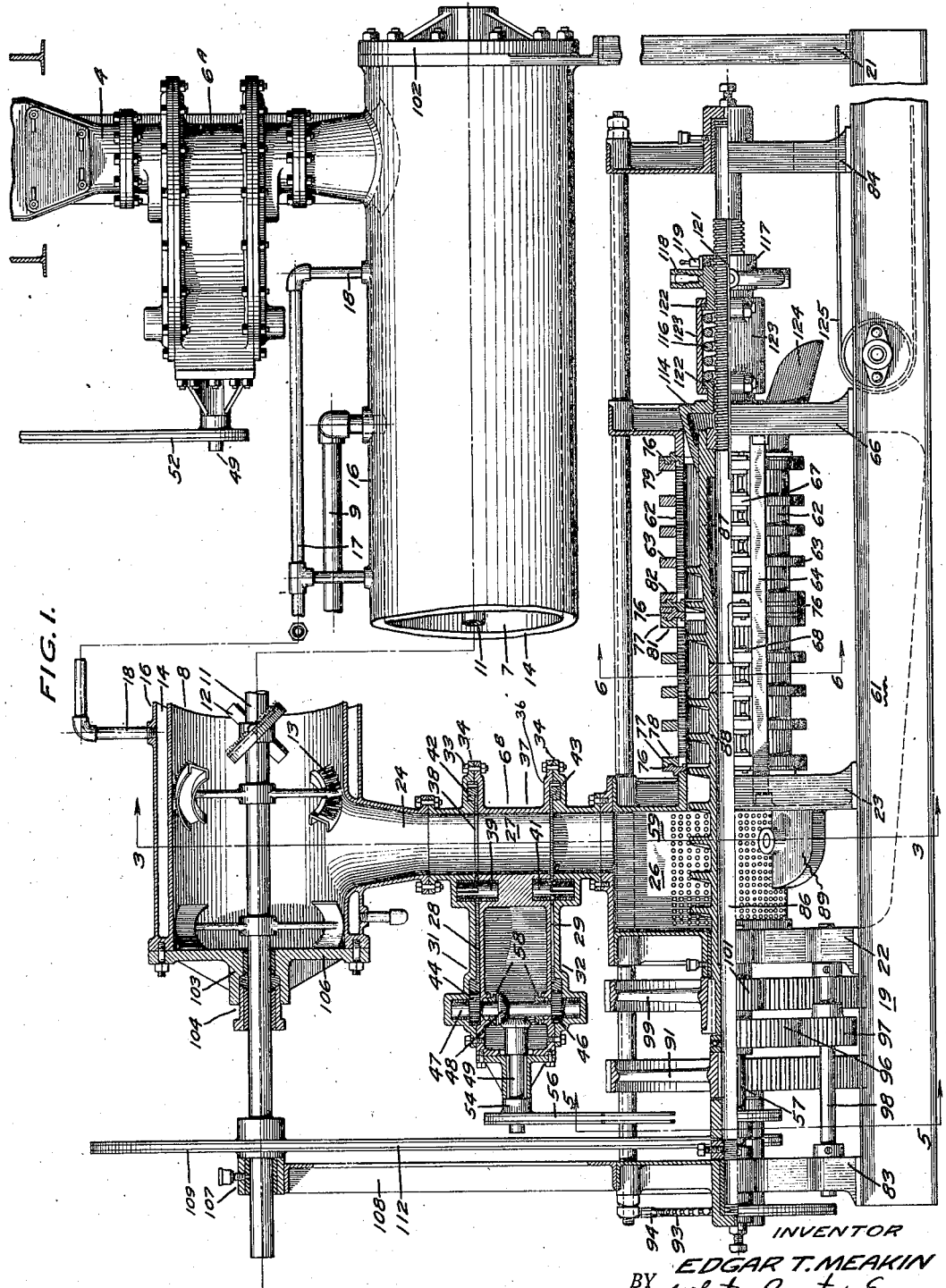
INVENTOR
EDGAR T. MEAKIN
BY White Prost & Evans
ATTORNEYS.

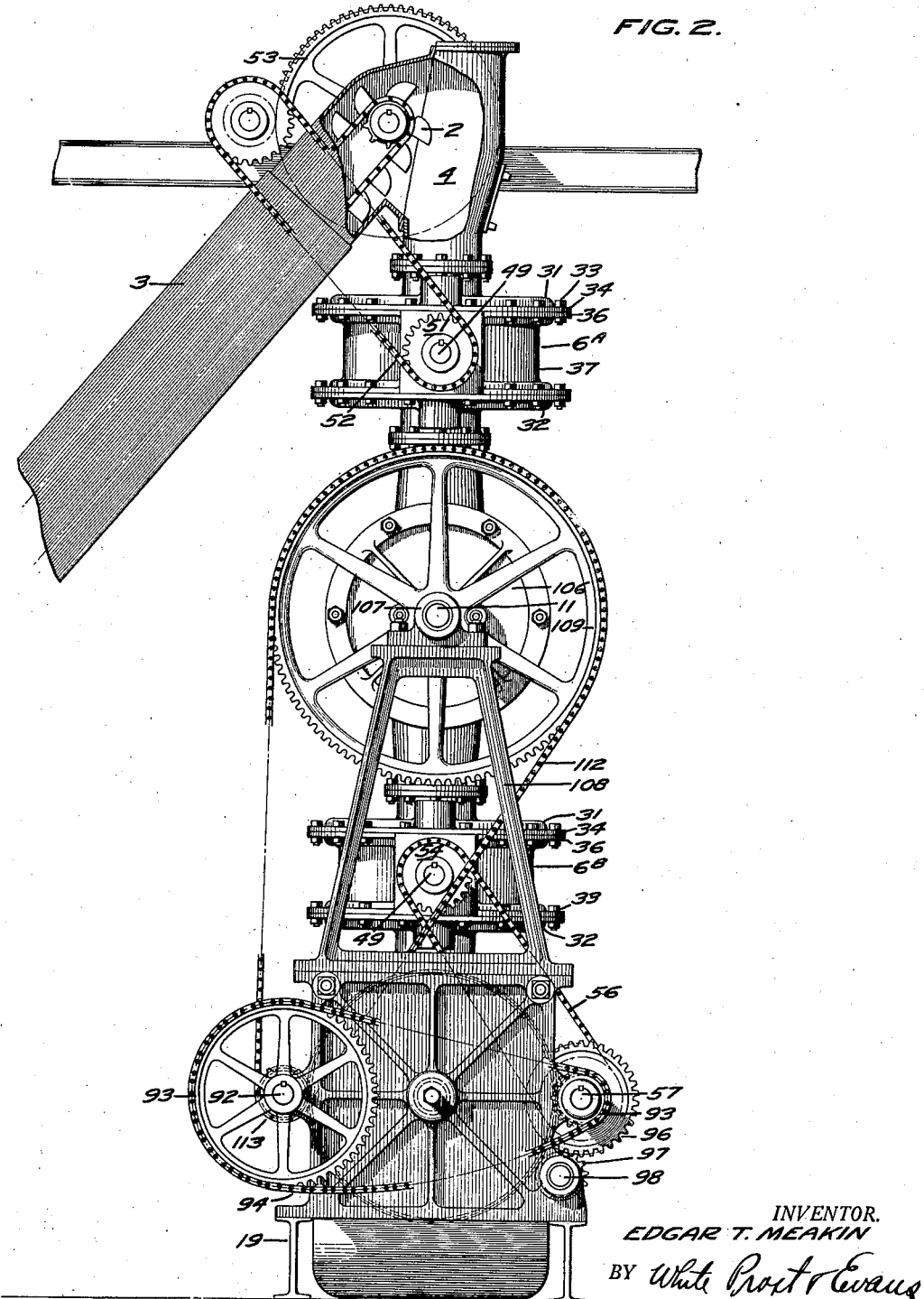

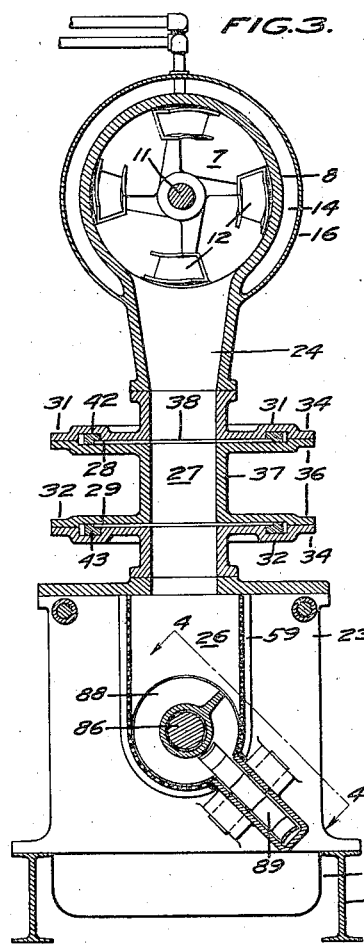
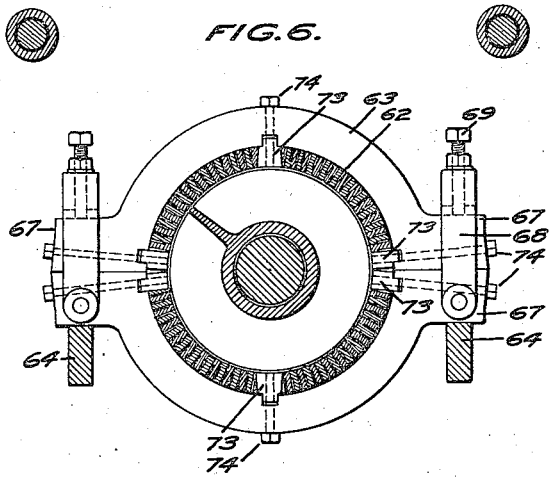
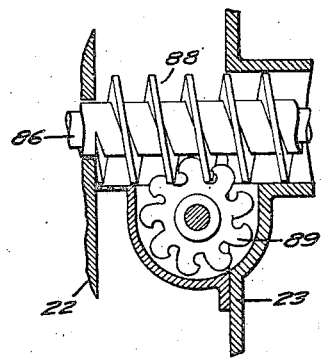
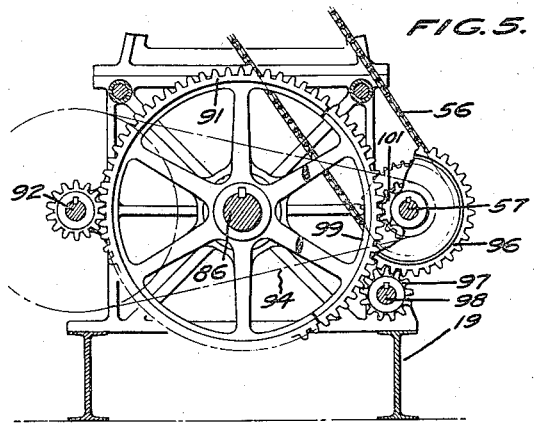
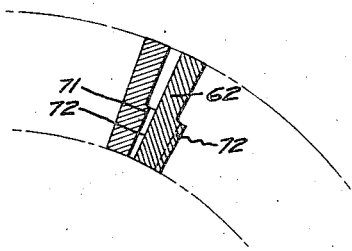
INVENTOR.
EDGAR T. MEAKIN.

Patented June 24, 1930

1,766,031

UNITED STATES PATENT OFFICE

EDGAR T. MEAKIN, OF BERKELEY, CALIFORNIA

APPARATUS FOR PROCESSING ANIMAL MATTER

Application filed November 13, 1922. Serial No. 600,593.

My invention relates to apparatus for processing animal or fish material in the production of oil, lard, tallow, tankage, fertilizer, cracklings, stock and poultry food and similar packing house and cannery by-products.

The broad object of my invention is the provision of an apparatus wherein the manufacture of the above named products may be continuously and economically carried on.

Another object of the invention is the provision of an apparatus wherein the mechanisms necessary for cooking and pressing are combined in a single machine.

Another object of the invention is the provision of an apparatus wherein a thorough cooking of the material is effected at a low temperature, thereby liberating a minimum quantity of water and preventing the loss of any constituent by solution, which process forms the subject matter of my co-pending application Serial Number 593,451.

Still another object is the provision of an apparatus wherein the aforesaid processes may be carried out in one-third the length of time heretofore required for the making of an inferior product.

My invention possesses other objects and features of advantage, some of which, with the foregoing, will be set forth in the following description of the invention. It is to be understood that I do not limit myself to the showing made by the said description, as I may adopt variant forms of the invention within the scope of the claims.

Referring to the drawings: Fig. 1 is a side elevation of the apparatus, most of the figure being shown in vertical section, and a portion thereof being displaced out of its true relationship to reduce the height of the figure. Fig. 2 is an end elevation of the apparatus shown in Fig. 1, the direction of the view being from a point at the left of Fig. 1. Fig. 3 is a vertical sectional view, the plane of section being indicated by the line 3—3 of Fig. 1. Fig. 4 is a sectional view taken thru a porton of the apparatus, the plane of section being indicated by the line 4—4 of Fig. 3. Fig. 5 is a vertical section taken on the line 5—5 of Fig. 1. Fig. 6 is a vertical section taken on the line 6—6 of Fig. 1. Fig. 7 is a cross sectional view of two of the press bars.

Animal or fish matter is preferably first cut up or shredded and placed on a conveyor 2 which, moving upwardly thru a housing 3, delivers the prepared material to a hopper 4. The hopper discharges the material into a feed valve $6^A$ identical in construction and operation with the discharge valve $6^B$ shown in section in Fig. 1, and later to be described. The feed valves $6^A$ and $6^B$ are so constructed as to permit the material to enter a vacuum cooking chamber indicated in its entirety by 7, and to discharge therefrom without destroying the vacuum maintained therein.

The vacuum cooking chamber or oven, into which the material is delivered from the feed valve $6^A$, comprises a cylindrical drum 8 vacuumized by suitable connections thru the conduit 9, with a vacuum apparatus of any desired type. The length of the drum is proportionate to the time required to thoroughly cook the material and the drum is preferably slightly inclined toward its discharge end. The movement of the material thru the drum is continuous. A shaft 11 is journaled in the drum, and has mounted thereon scoop-shaped feeding blades 12 provided with brushes 13, and overlapping so that rotation of the shaft propels the material thru the drum and at the same time stirs it so that all portions of the material are kept moving and exposed evenly to the heat. The brushes 13, which are preferably of wire and in engagement with the wall of the drum, prevent the accumulation or caking of the material on the wall thereof, and the consequent heat insulating effect which would otherwise be produced between the drum and a steam jacket 14 formed between the drum and a surrounding shell 16. Steam may be supplied to the jacket 14 thru the conduit 17 and delivery pipes 18 at any desirable pressure from a suitable source.

The oven or drum 8 is supported on beams 19 at one end by the bracket 21, and at the other by the discharge valve 6$^B$ superposed on frames 22 and 23 forming part of the press structure.

The functions of the discharge valve 6$^B$ and the feed valves 6$^A$ are similar, the feed valve delivering material from the hopper 4 to the vacuum oven, and the discharge valve delivering the cooked material from the vacuum oven thru a discharge hopper 24 to the receiving chamber 26 of the press, both valves acting to preserve unchanged the conditions within the oven.

The valves 6$^A$ and 6$^B$ comprise feed chambers 27 controlled by inlet and outlet plate valves or disks 28 and 29. The disks are arranged in recesses formed in upper and lower valve housings 31 and 32 secured by bolts 33 which pass thru flanges 34 on the valve housings and flanges 36 of the feed chamber housing 37. Each of the disks is provided with an aperture 38, the aperture in each plate being diametrically opposite to the aperture in the other plate, so that only one aperture at a time may register with the feed chamber 27 and the hoppers. Lapping of the apertures would of course create a continuous passage out of the oven thru which the vacuum would be destroyed. The disks are mounted for rotation in the housings 31 and 32 on shafts 39 and 41, journaled in alined bearings in the housings 31, 37 and 32. The disks are provided at their peripheries with ring gears 42 and 43 respectively, in mesh with pinions 44 and 46 mounted on shaft 47 driven thru bevel gears 48 by shaft 49 that are in turn driven by sprockets and chains from any of the power shafts of the apparatus. The feed valve 6$^A$ is in this instance driven by sprockets 51 and a chain 52 thru suitable gearing 53 from the conveyor 2. The discharge valve 6$^B$ being driven thru sprockets 54 and a chain 56 from a power shaft 57 forming part of the pressing driving mechanism. It is to be noted that the speed of operation of the discharge valve disks is coordinated with the speed of movement of the material thru the cooking drum so that the cooked material is removed as soon as it reaches the discharge end of the drum. In a similar manner the speed of operation of the feed valve disks is proportioned so that the material to be processed flows in a continuous stream into and out of the drum, utilizing the latter to its highest point of efficiency.

In order to guard against possible destruction of the vacuum in the oven by leakage thru the feed or discharge valves, the plate valves are accurately machined on their faces to insure proper contact between them and their housings. Leakage around the shafts 47 is also prevented by the provision of packing glands 58 around the shafts adjacent the pinions 44.

The receiving chamber 26 of the press is formed with a foraminated wall 59 to permit the drainage of free oil into a catch basin 61 underlying the press structure. The press comprises a cylinder composed of longitudinally disposed grooved bars 62 built up in semi-cylindrical form and retained in position by encircling rings 63 supported on longitudinally disposed beams 64 extending between the frame 23 and the press cylinder supporting frame 66. The rings 63 are formed in two parts, as best shown in Fig. 6, each part having radially extending lugs 67. A clamp yoke or clevis 68 provided with a screw 69 is pivoted on each end of the lower half of each ring, and provides means for clamping the two halves of each ring together. The bars 62 of the press cylinder have a cross section, as shown in Fig. 7, one of the faces of each bar having a wide flange 71 provided with grooves 72 forming a multiplicity of minute passages thru which fluid extracted from the matter in the cylinder may pass. In order to firmly secure the bars, tapered blocks 73 controlled by screw 74 are interposed between the bars at intervals as shown. The bars in each section of the cylinder, which is preferably made in two parts, are assembled within two piece positioning rings 76 suitably flanged to fit in complementary annular groves 77 formed in end rings 78 and 79 and intermediate rings 81 and 82. The end rings and the intermediate rings are formed in two parts similar to the rings 63, and being secured thereto are adapted to be clamped together by the clevises 68 and supported by the longitudinal bars 64. Easy access may be had to the interior of the press by loosening the clevis screws 69 allowing the clevises to be swung out, and removing the upper half of the assembled press cylinder.

Disposed within the press cylinder and receiving chamber and suitably journaled in the frame 22 and end bearing frames 83 and 84 is a shaft 86 upon which a pressure screw 87 is keyed. Journaled on the shaft 86 is a sleeve comprising a second pressure screw 88. The material is removed from the foraminated chamber 59 by the screw 88 and the initial pressure applied before passing it to the screw 87 moving at a slower speed and having a larger diameter body so that less space is provided for the material passing therethru. In order to prevent turning of the material in the receiving chamber of the press, a feed wheel 89 meshing with the threads of the screw 88 is arranged as shown in Figs. 3 and 4. This feed wheel by preventing packing of the material in the threads of the screw insures its entrance into the press cylinder. It is to be noted that the feed wheel is arranged to revolve in a plane coincident with the axis of the screw and that this plane as shown in Fig. 3, preferably lies at about 45° to the horizontal on that side of the screw opposite to the side on which the material begins its movement between the threads.

The shaft 86 is driven by a gear 91 keyed thereto and in mesh with a pinion on a secondary power shaft 92, Figure 2, driven by sprockets 93 and a chain 94 from the power shaft 57 from which the discharge valve 6^B is driven. The power shaft 57 is driven thru a gear 96 and pinion 97 on a primary power shaft 98 from a suitable power source. The sleeve 88 is driven by a gear 99 keyed thereto which is in mesh with a pinion 101 on the power shaft 57.

The shaft 11 is journaled at the inlet valve end of the oven in an enclosed bearing on an oven head 102. The opposite end of the shaft 11 extends thru a bearing 103 and a suitable packing gland 104 arranged in a second oven head 106, and at its outer end is journaled in a bearing 107 supported by a bracket 108 on the end bearing frame 83. Power is transmitted to the shaft 11 by a sprocket 109 keyed thereto, thru a chain 112 from a sprocket 113 keyed to the secondary power shaft 92.

The end of the press cylinder is closed by a conical plug 114 mounted on the shaft 86. A spring 116 is interposed between the plug 114 and a collar 117 threaded on the shaft and provided with handles 118 for rotating the collar to vary the pressure of the spring on the plug and hence the pressure exerted upon the material in the press cylinder. A pin 119 spring-pressed in the collar against a key way 121 cut in the shaft prevents accidental rotation of the collar. Both collar and plug are provided with flanges 122 on their adjacent ends which are connected by a sleeve 123 so that the plug may be backed out of the press cylinder by rotation of the collar. A delivery chute 124 is arranged on the frame 66 adjacent the plug 114 to guide the material delivered from the press cylinder onto a conveyor 125 disposed between the supporting frames 19 for removal from the apparatus.

It will thus be seen that I have provided an apparatus which by virtue of its continuous and automatic operation will reduce the time heretofore required for the manufacture of meal, also that its mechanical construction is such as to require a minimum of attention during operation.

I claim:

1. In an apparatus for processing animal matter, an oven, means for heating said oven, means for vacuumizing said oven, a feed chamber communicating with one end of said oven and a discharge chamber communicating with the opposite end thereof, rotary inlet and a rotary outlet valve for each chamber, and means interconnecting and interoperating the two valves in each of said chambers whereby the inlet valve is closed when the outlet valve is open and the outlet valve is closed when the inlet valve is open thereby maintaining the degree of vacuum in said oven substantially constant.

2. In an apparatus for processing animal matter, an oven, means for heating said oven, means for vacuumizing said oven, means for causing a continuous flow of material into said oven, means for causing a continuous discharge of cooked material from said oven while maintaining the degree of vacuum substantially constant, and means communicating with said discharge means for pressing said cooked material to substantial dryness.

3. In an apparatus for processing animal matter, a cooking oven, means for vacuumizing said oven, a feed chamber communicating with one end of said oven and a discharge chamber communicating with the other end thereof, a rotary inlet valve for controlling the entrance of material into each of said chambers, a rotary outlet valve for controlling the discharge of material from each of said chambers, and means interconnecting and interoperating the two valves in each of said chambers so that one valve is closed when the other valve is open.

4. In an apparatus for processing animal matter, a cooking oven, means for vacuumizing said oven, a feed chamber communicating with one end of said oven and a discharge chamber communicating with the other end thereof, an inlet valve in each of said chambers for controlling the entrance of material thereto, an outlet valve in each of said chambers for controlling the discharge of material therefrom, means interconnecting and interoperating the two valves in each of said chambers so that the inlet valve is closed when the outlet valve is open and the inlet valve is open when the outlet valve is closed, and means for feeding material thru said drum at a speed correlated to the opening and closing of the valves of the discharge chamber.

5. In an apparatus for processing oil-bearing animal matter, an oven, means for heating said oven, means for vacuumizing said oven, a feed chamber communicating with the oven at one end thereof and a discharge chamber communicating with the oven at the opposite end thereof, the feed and discharge chambers being each provided with an inlet valve and an outlet valve for controlling respectively the entrance of material into and the discharge of material from said feed and discharge chambers, means interconnecting with and operating the inlet and discharge valves in each of said chambers whereby the inlet valve is closed when the outlet valve is open and the inlet valve is open when the outlet valve is closed, and means for causing a continuous flow of material through said oven.

In testimony whereof, I have hereunto set my hand.

EDGAR T. MEAKIN.